May 4, 1943.  M. A. CROSBY  2,318,203
PLASTIC INJECTION MACHINE
Filed July 19, 1939
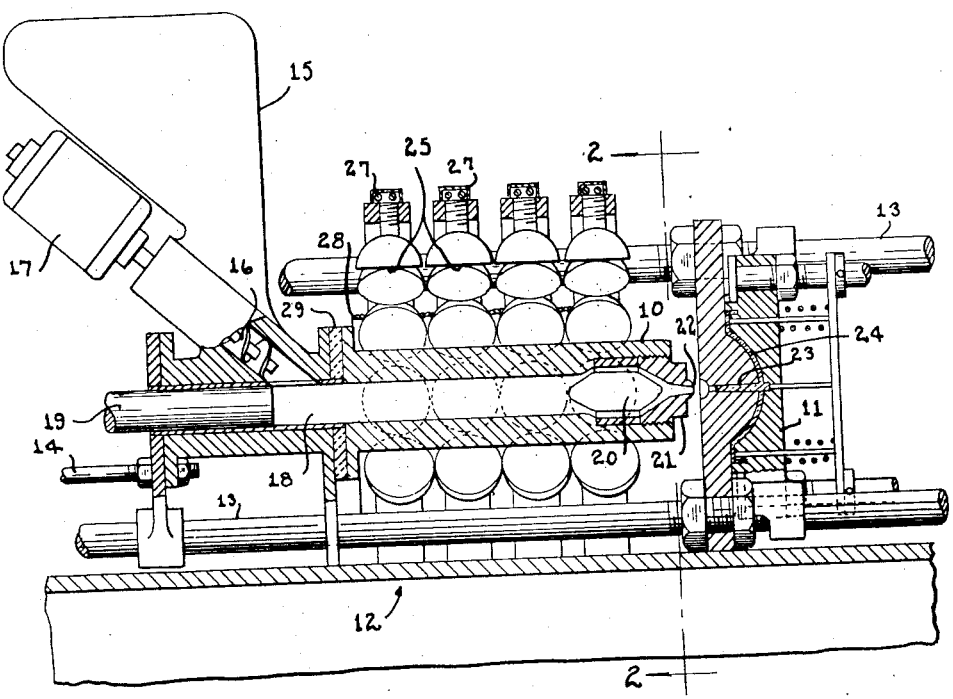
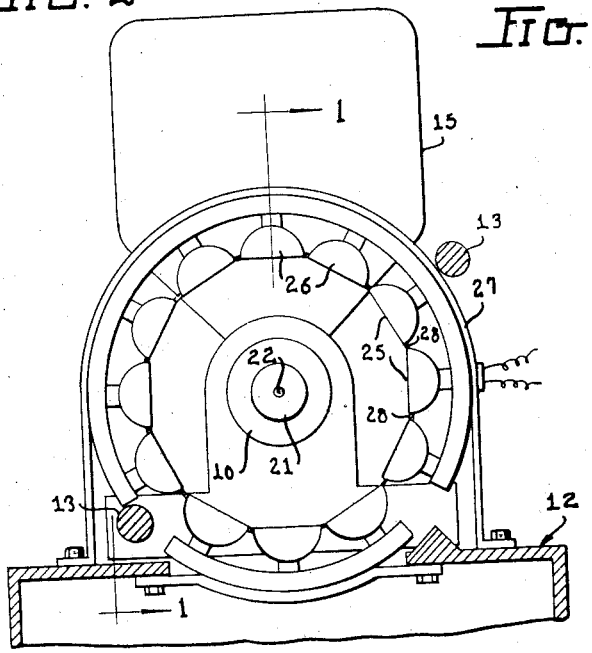
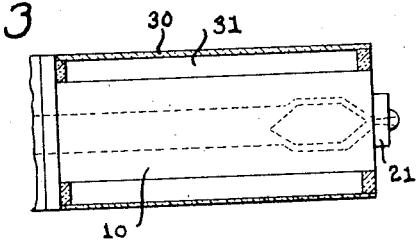
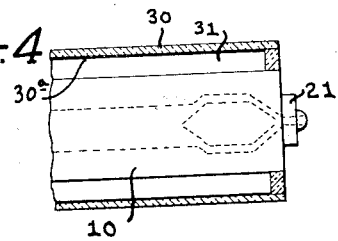
Inventor
MELVIN A. CROSBY
by Toulmin & Toulmin
Attorneys Patented May 4, 1943

2,318,203

UNITED STATES PATENT OFFICE 2,318,203

PLASTIC INJECTION MACHINE

Melvin A. Crosby, Dayton, Ohio, assignor to The Hydraulic Development Corp., Inc., Wilmington, Del., a corporation of Delaware Application July 19, 1939, Serial No. 285,421

4 Claims. (Cl. 18—30)

This invention relates to plastic molding and more particularly to an improved apparatus for heating thermoplastic and thermosetting materials so that they can be injection molded.

Another object of this invention is to provide low cost heating equipment for use in raising the temperature of material to be molded in transfer injection molding devices.

Another object of this invention is to utilize the infra-red or near infra-red radiation energy for heating the injection chamber of molding machines of this character.

Another object is to provide an improved apparatus for economically and efficiently heating the plastic material being injection molded without the use of expensive and complicated heating means, which has been conventional heretofore with the use of steam, electric coils, oil or hot water.

Another object is to provide a new type of injection molding device wherein infra-red radiant energy is enclosed about the injection cylinder so as to raise the temperature thereof uniformly to render the material therein plastic.

Another object is to devise means for concentrating heat rays around the injection chamber in such a manner that reflected heat rays are redirected against the injection chamber so as to increase the efficiency of the heating unit.

An additional object is to provide such a control of heat as to permit of the injection of thermosetting resins where extreme accuracy of the control of temperature is required. By the use of infra-red rays the heat can be very quickly accumulated in the cylinder walls of the injection cylinder and in the internal metal parts of the cylinder such as the torpedo. In this arrangement the means of heating the torpedo is not only eliminated but the resistance to plastic flow due to heat connections to the torpedo is eliminated.

These and other objects and advantages will occur to those skilled in the art in light of the following description and drawing.

In the drawing:

Figure 1 is an elevation view in section of my improved injection molding machine;

Figure 2 is a vertical section taken on the line 2—2 of Figure 1, looking in the direction of the arrows;

Figure 3 is a detail sectional view of a modified injection cylinder comprising a transparent outer casing;

Figure 4 is a similar detail view of a modification wherein the injection cylinder is encased in an infra-red ray transmitting and reflecting means.

GENERAL PROCEDURE

In injection molding the plastic is heated outside the mold until a soft flowable dough-like mass is formed and then, while in this heated state, it is forced into the mold under heavy pressure. Heretofore injection molding was confined to thermoplastic materials as contrasted with thermosetting substances, which were molded by the compression method. Thermoplastics remain soft and flowable under heat and pressure, whereas thermosetting materials after being heated for a certain length of time take on a permanent irreversible set.

By my improved process the plastic material is heated in a cylinder adjacent the mold and the material is rapidly brought up to a temperature at which the material is flowable and is immediately injected under pressure into the mold. In this method the heating and injection of the plastic material in the mold are performed automatically and at such a speed that the setting or curing of thermosetting substances does not occur until after it has been forced into the mold cavities. In both compression and injection molding the most important problem is the uniform heating and temperature control of the material to render it plastic so that it can be readily molded. The material must be heated to the proper temperature before it can be forced into the mold; however, too high a temperature must be avoided, otherwise discoloration or decomposition of the plastic material may take place impairing the product.

For injection molding thermosetting plastics, it will be understood the molds will be maintained hot for sufficient time to bring about setting or curing of the molded material. When molding thermoplastic material, however, the mold need not be heated, and is preferably cooled by cold water or the like so that rapid cooling of the molded material is effected.

*Injection molding mechanism*

Referring to the drawing in detail, there is illustrated in Figures 1 and 2 a conventional type of injection molding mechanism wherein the transfer injection cylinder 10 and mold member 11 are suitably mounted on the frame or body generally designated 12. The injection cylinder is slidably arranged on the members 13 so that it can be periodically moved in contact with the mold 11 and the plastic material in the bore of the cylinder injected in the mold cavity. For reciprocating the injection cylinder a push-pull connecting rod means 14 is provided which is actuated by a suitable prime mover.

Material to be molded, such as cellulose acetate, ethyl cellulose, acrylic, urea and phenol formaldehyde resins and the like, is placed in the hopper 15 from where it is fed by a screw conveyor or equivalent means 16, operated by an electric motor 17, into the bore 18 of the injection cylinder 10. Preferably the material to be molded is in the form of powder, granules, flakes, chips or the like.

In one end of the cylinder bore 18 is a plunger or piston 19, which is operated as a ram by hydraulic or other suitable means, to force the softened plastic outward over the spreader 20, nozzle 21, orifice 22, gate 23, into the mold cavity 24.

The machine is preferably operated automatically so that the proper amount of material for filling the mold cavity is introduced into the cylinder bore 18 and after it has reached the desired degree of plasticity the injection cylinder and mold are brought together and the ram 19 actuated to inject the plastic material into the mold cavity 24. On completion of the injection the cylinder is moved away from the mold and returned to the position shown in Figure 1. Plunger 19 is then withdrawn to the right. After the mold is opened and the molded article ejected therefrom and the mold closed, the cycle of operation described is repeated. It will be appreciated that suitable mechanical timing means may be employed for controlling the different steps in the cycle of operation.

Method of heating material to be molded

For heating the material in the bore of the cylinder 10 there is arranged circumferentially therearound a plurality of infra-red radiating lamps 25, as illustrated in Figures 1 and 2. These lamps may be of the carbon filament type of 500 to 1000 watt capacity. The lamps are provided with reflectors 26 and the whole mounted on a ring or circular supporting member 27, and the rays focused on the surfaces of the cylinder 10. Between the lamps a gold or aluminum plated reflector sheet 28 is arranged so as to reflect the infra-red rays which may be reflected from the surface of the injection cylinder 10. In order to provide for efficient absorption of the infrared rays on the surface of the cylinder it is purposely made rough and may be blackened. Insulation material 29 is suitably positioned between the adjacent feeding mechanism and the injection cylinder to prevent preheating of the material prior to its entry into the injection cylinder bore.

It will be understood that in the use of the machine the material to be molded is moved progressively forward towards the discharge orifice or nozzle of the injection cylinder while it is being uniformly heated by the heat lamps arranged around the cylinder. The movement and the heating, it will be appreciated, are carefully regulated and timed in proportion to the rate at which the material is brought to the proper plasticity for injecting into the mold. Premature heating and excessive heating of the organic material are avoided in this way and when the molding material is brought to the proper degree of plasticity it is discharged from the injection chamber into the mold at periodic intervals.

As shown in Figure 3, an alternative construction of the injection cylinder may be utilized which comprises encasing the cylinder in a glass or suitable infra-red transparent material 30. For this purpose there may be used fused quartz, high borosilica or nickel oxide glass, which is transparent to infra-red. The space 31 between the glass casing and the injection cylinder surface may be filled with air or water or other suitable liquid, as desired, to provide even distribution of heat around the injection cylinder.

As a further modification the glass 30 may comprise a half mirror 30a or be polished on the inner surface and rough or frosted on the outer side to allow infra-red rays to pass through to the cylinder, but will reflect the rays that are reflected back against the under surface of the glass from the surface of the injection cylinder as more clearly shown in Figure 4. The partial or half mirror glass, it will be understood, is made of nickel oxide glass or equivalent composition which is transparent to infra-red rays.

As an additional modification the injection cylinder may be made of infra-red transmitting glass or other suitable material which will transmit infra-red. In this instance the thickness of the cylinder will be sufficient to withstand the injection pressure and the heat lamps will in this case be focused on the interior plastic material. This arrangement provides an efficient means for rapidly heating the material so that it can be injected into the mold.

It will be understood that this invention is not limited to the exact details of the apparatus disclosed or the specific method but may be varied to suit different conditions and uses without departing from the spirit of this invention.

Having thus fully described my invention, what I claim as new and desire to secure by Letters Patent is:

1. An apparatus for injection molding plastic materials having an injection cylinder for receiving plastic material which is heated therein and which material is ejected from the cylinder after being heated in the cylinder by means of a plunger which reciprocates within the cylinder characterized by; heating means comprising infra-red radiating lamps, said lamps having reflectors and arranged circumferentially around said injection cylinder throughout substantially the full length thereof, and means comprising a reflector sheet positioned between said lamp reflectors for redirecting stray radiation back to the surface of the injection cylinder.

2. An apparatus for injection molding thermoplastic and thermosetting materials having a cylinder into which the materials are fed by a feeding mechanism for heating within the cylinder until the materials are softened sufficiently to permit ejection thereof from the cylinder by means of a plunger which reciprocates within the cylinder characterized by; infra-red ray transparent wall means enclosing the injection cylinder and spaced therefrom to provide a closed chamber, a fluid in said chamber, and infra-red radiating lamps positioned circumferentially and longitudinally about said wall means.

3. An apparatus for injection molding thermoplastic and thermosetting materials having a cylinder into which the materials are fed by a feeding mechanism for heating within the cylinder by means of a plunger which reciprocates within the cylinder characterized by; wall means comprising a half mirror and substantially transparent to infra-red rays enclosing the injection cylinder and spaced therefrom to provide a closed chamber, a fluid in said chamber, and infra-red radiating lamps positioned circumferentially and longitudinally about said wall means.

4. An apparatus for injection molding thermoplastic and thermosetting materials having a cylinder into which the materials are fed by a feeding mechanism for heating within the cylinder by means of a plunger which reciprocates within the cylinder characterized by; wall means comprising a material which passes infra-red rays substantially in one direction only and reflects rays incident thereto passing in the opposite direction enclosing the injection cylinder and spaced therefrom to provide a closed chamber, a fluid in said chamber, and infra-red radiating lamps positioned circumferentially and longitudinally about said wall means.

MELVIN A. CROSBY.